United States Patent
De Graaf et al.

(10) Patent No.: US 8,770,251 B2
(45) Date of Patent: Jul. 8, 2014

(54) TYRE BUILDING DRUM FOR BUILDING AN UNVULCANISED TYRE

(75) Inventors: Martin De Graaf, Emst (NL); Antonie Slots, Heeten (NL); Gerrit Mulder, Oene (NL)

(73) Assignee: VMI Holland B.V., Epe (NL)

( * ) Notice: Subject to any disclaimer, the term of this patent is extended or adjusted under 35 U.S.C. 154(b) by 135 days.

(21) Appl. No.: 12/468,878

(22) Filed: May 20, 2009

(65) Prior Publication Data

US 2010/0122775 A1 May 20, 2010

Related U.S. Application Data

(60) Provisional application No. 61/128,517, filed on May 22, 2008.

(51) Int. Cl.
*B29D 30/26* (2006.01)
*B29D 30/32* (2006.01)

(52) U.S. Cl.
USPC .................... 156/402; 156/414; 156/415

(58) Field of Classification Search
USPC ................ 156/132, 414, 415, 417, 400, 402
See application file for complete search history.

(56) References Cited

U.S. PATENT DOCUMENTS

| | | | |
|---|---|---|---|
| 4,582,557 A * | 4/1986 | Enders | 156/401 |
| 5,136,932 A * | 8/1992 | Giamello | 91/497 |
| 6,199,442 B1 * | 3/2001 | Bauer et al. | 74/411.5 |
| 6,308,566 B1 * | 10/2001 | Matsumoto et al. | 73/462 |
| 6,640,863 B2 * | 11/2003 | Terazono | 156/402 |
| 6,758,930 B1 * | 7/2004 | Felten | 156/111 |

(Continued)

FOREIGN PATENT DOCUMENTS

| | | |
|---|---|---|
| CN | 1649719 A | 8/2005 |
| EP | 1 595 694 A1 | 11/2005 |
| WO | 2007/110039 A1 | 10/2007 |

OTHER PUBLICATIONS

International Search Report dated Feb. 8, 2009 for Application No. PCT/NL2009/050264.

(Continued)

*Primary Examiner* — Martin Rogers
(74) *Attorney, Agent, or Firm* — Ladas & Parry LLP (57) ABSTRACT

Tire building drum having a drum shaft and two drum halves arranged around the drum shaft. In the drum shaft one threaded spindle is arranged. On either side of the center of the tire building drum a driving nut is arranged on the spindle. Each driving nut is fixedly connected to the drum half in question via a connection part. Each drum half has a folding arm unit that is connected to the drum half in question so as to swing. The folding arm unit is movable in axial direction of the tire building drum. Each drum half further has a bead ring core clamping unit intended for supporting and clamping a bead ring core. The bead ring core clamping unit is arranged on a cylindrical part. The cylindrical part is provided with a cylinder slot for accommodating the connection part and with a locking mechanism. The locking mechanism can be brought into engagement with the drum shaft. At engagement of the locking mechanism in the drum shaft the folding arm unit can be moved with respect to the cylindrical part in axial direction of the tire building drum.

9 Claims, 7 Drawing Sheets

(56) References Cited

U.S. PATENT DOCUMENTS

| | | |
|---|---|---|
| 6,837,292 B2 * | 1/2005 | De Graaf et al. .............. 156/402 |
| 6,880,603 B2 * | 4/2005 | Akiyama ...................... 156/402 |
| 6,893,250 B2 * | 5/2005 | Meschia et al. ............... 425/595 |
| 7,101,451 B2 | 9/2006 | Zemla et al. |
| 7,144,466 B2 * | 12/2006 | Jungk .......................... 156/132 |
| 2004/0250941 A1 * | 12/2004 | Jungk .......................... 156/132 |
| 2006/0102272 A1 * | 5/2006 | Iyanagi et al. ................ 156/132 |

OTHER PUBLICATIONS

Search Report dated Sep. 25, 2013 for Taiwanese Application No. 098116481.

* cited by examiner

TYRE BUILDING DRUM FOR BUILDING AN UNVULCANISED TYRE

This application claims the benefit of U.S. Provisional Application No. 61/128,517 filed May 22, 2008 and incorporates the same by reference.

BACKGROUND OF THE INVENTION

The invention relates to a tyre building drum for building an unvulcanised tyre using rubber tyre components, wherein the tyre building drum comprises a central drum shaft and two drum halves arranged at least almost substantially symmetrical with respect to the centre of the tyre building drum and around the drum shaft.

Such a tyre building drum is known from EP-B1-1.439.054. Said known tyre building drum comprises a base spindle for the folding units, around which base spindle a hollow second spindle for the bead ring core clamping units is arranged coaxially. The base spindle can be coupled to the hollow second spindle by means of a connectable coupling, so that both spindles can be coupled to each other (for moving the entire drum half) and uncoupled from each other. Although compared to other tyre building drums using a pneumatic drive for the folding arm carrier bodies said known tyre building drum due to use of particularly the base spindle provides a considerable improvement regarding the synchronous lifting of two folding arm units, the known tyre building drum has a few drawbacks. For instance the connectable coupling does not only constitute a relatively expensive and complicated additional part, said connectable coupling is also difficult to repair in case of a failure. Due to the use of the two coaxial spindles the tyre building drum is also relatively long and bulky.

SUMMARY OF THE INVENTION

It is among others an object of the invention to provide a tyre building drum for building an unvulcanised tyre that is maintenance-friendlier and which can be designed more compact.

For that purpose according to the invention a tyre building drum for building an unvulcanised tyre of the type mentioned in the preamble is characterised in that in the drum shaft one threaded spindle is arranged, wherein on either side of the centre of the tyre building drum the thread has an equal-sized pitch yet in opposite direction, wherein on either side of the centre of the tyre building drum a driving nut is arranged on the spindle, wherein each driving nut is fixedly connected to the drum half in question via a connection part, wherein the drum shaft is provided with a drum shaft slot for accommodating the connection part, wherein both drum halves are movable in axial direction of the tyre building drum, wherein each drum half comprises a folding arm unit with folding arms, that are connected to the drum half in question so as to swing, wherein the folding arm unit is movable in axial direction of the tyre building drum, wherein each drum half further comprises a bead ring core clamping unit, intended for supporting and clamping a bead ring core, wherein the bead ring core clamping unit is arranged on a cylindrical part arranged around the drum shaft, wherein the cylindrical part is provided with a cylinder slot for accommodating the connection part and with a locking mechanism, wherein the locking mechanism can be brought into and out of engagement with the drum shaft, wherein at engagement of the locking mechanism in the drum shaft the folding arm unit can be moved with respect to the cylindrical part in axial direction of the tyre building drum. By using the locking mechanism it is possible on the one hand (in the position in which the locking mechanism is out of engagement with the drum shaft) to move the entire drum half axially, and on the other hand (in the position in which the locking mechanism is in engagement with the drum shaft) it is possible to move the folding arm unit axially with respect to the cylindrical part. In this way only one spindle will be necessary for the operation of the bead ring core clamping unit and the operation of the folding arm unit, as a result of which the tyre building drum can be designed maintenance-friendlier and more compact.

In one embodiment of a tyre building drum according to the invention the locking mechanism comprises a piston part that can be pneumatically activated, which piston part is provided with piston part teeth, wherein the drum shaft is provided with drum shaft teeth, wherein the piston part teeth can be brought into engagement with the drum shaft teeth. As a result it is possible to accurately realise an engagement of the locking mechanism and the drums.

When the locking mechanism is placed shifted in circumferential direction with respect to the cylinder slot, the drum half can be designed relatively simple as regards construction.

In one embodiment of a tyre building drum according to the invention the cylindrical part comprises a piston chamber in which a piston can be moved, which piston is fixedly connected to the folding arm unit. As a result the operation of the folding arm unit can be supported by the spindle.

In an advantageous embodiment of a tyre building drum according to the invention each drum half comprises a unit that can be pneumatically activated for radially moving the bead ring core clamping unit.

In a further advantageous embodiment of a tyre building drum according to the invention each drum half comprises a casing cover part that is axially movable with respect to the cylindrical part, which casing cover part forms an at least substantially closed casing surface for supporting rubber components and at the circumference is provided with recesses for accommodating the folding arms. A substantially closed casing surface for supporting rubber components is known per se from WO 01/68356. In that case, however, the casing surface is formed by individual casing surface parts that have each been movably arranged on a folding arm. In the inactive position of the folding arms the casing surface parts together form a substantially closed casing surface. Said known embodiment however is a relatively complicated and expensive embodiment. According to the invention the casing cover part is formed by a single cylindrical part that is relatively easy to produce at low-cost. Due to the axial movement of the casing part the rolls of the folding arms are released, after which the folding arms can be moved at greater distance from the drum shaft. This also offers the opportunity in a further embodiment of a tyre building drum according to the invention to provide the casing cover part with a vacuum device for retaining rubber components on the casing cover part.

An as regards construction relatively simple embodiment of a tyre building drum according to the invention is realised when the bead ring core clamping unit comprises a shoulder part for supporting a bead core, which shoulder part is mechanically connected to the casing cover part by a mechanical connection.

In one advantageous embodiment of a tyre building drum according to the invention the spindle is driven by a servomotor. Particularly when the locking mechanism comprises a piston part with teeth, the servomotor is able to give a position signal to the operation of the locking mechanism when the correct position has been reached at which the locking mechanism should be activated. In this way a highly accurately functioning tyre building drum can be realised.

SHORT DESCRIPTION OF THE DRAWINGS

The invention will be elucidated on the basis of an exemplary embodiment shown in the attached drawings, in which.

DETAILED DESCRIPTION OF THE DRAWINGS

Figure 1:
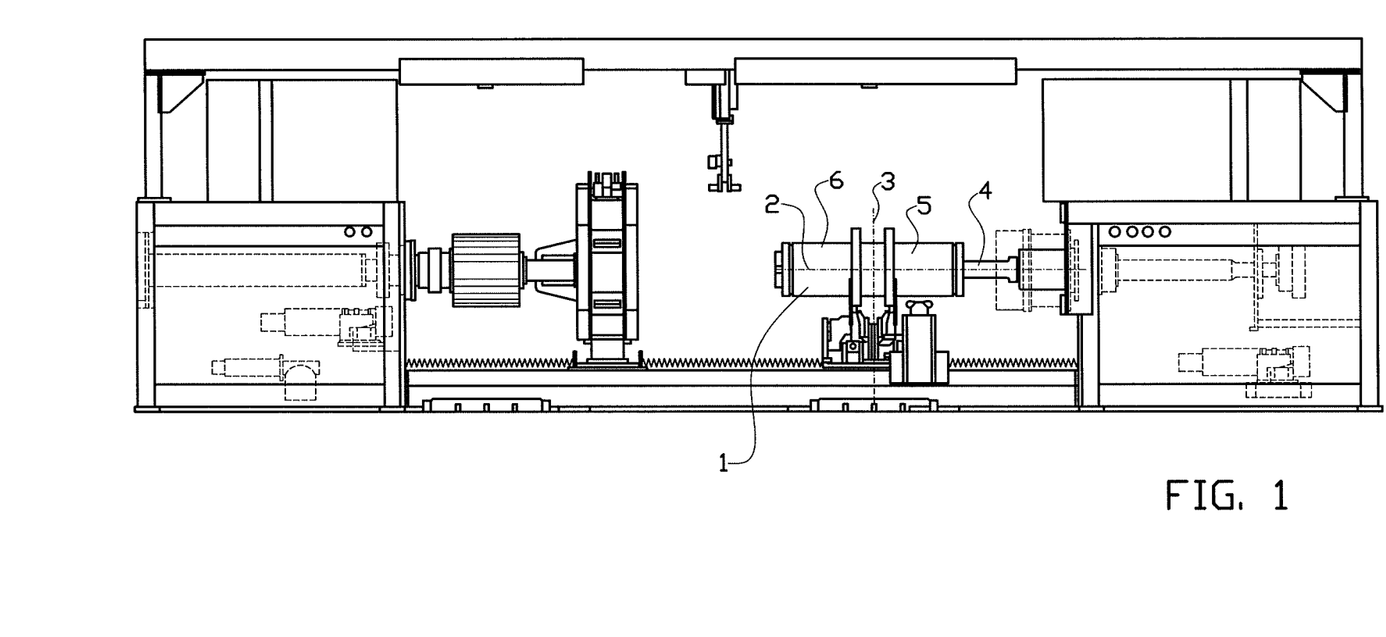
FIG. 1 schematically shows a tyre building drum for building an unvulcanised tyre as a part of a larger tyre building assembly.
Figure 1B:
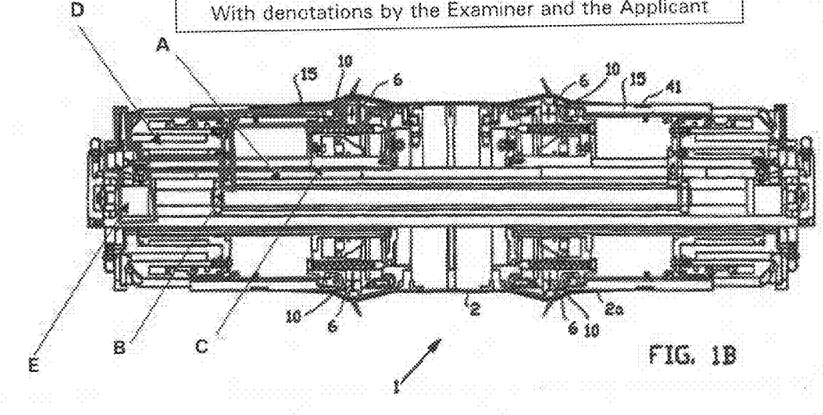
Figure 1C:
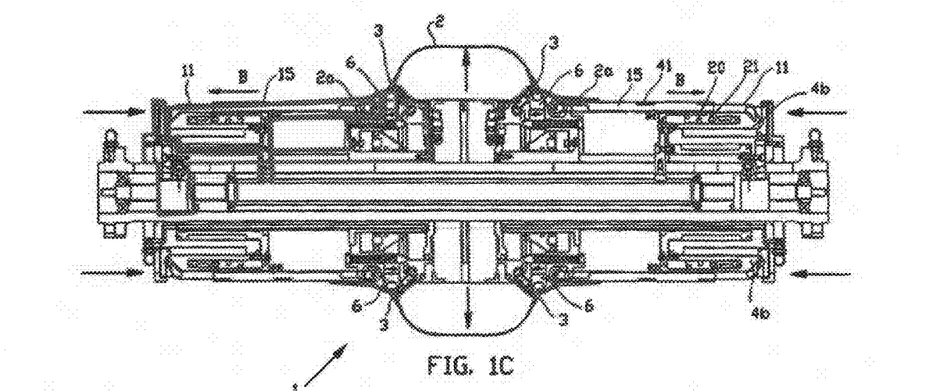
Figure 1D:
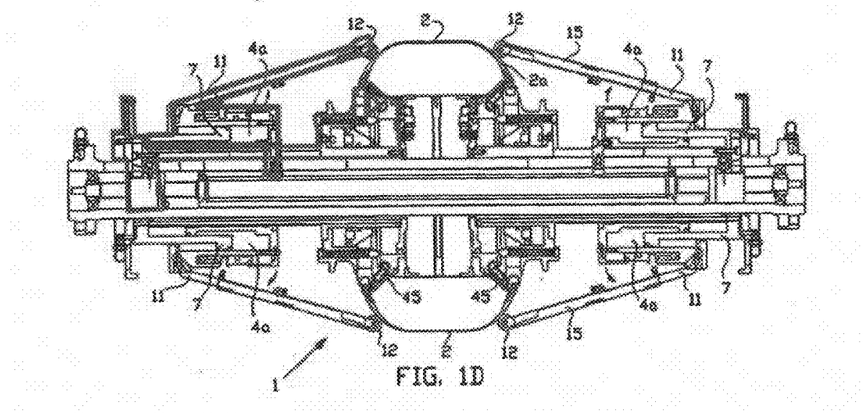

FIG. 1 schematically shows a tyre building drum 1 for building an unvulcanised tyre as a part of a larger tyre building assembly.

FIGS. 2A-2F schematically show cross-sections of a part of the inventive tyre building drum 1 for building an unvulcanised tyre. The tyre building drum 1 is at least almost substantially a-symmetrical with respect to the longitudinal drum centre line 2 and with respect to the centre 3 (FIG. 1) of the drum 1. For this reason the building parts that are always situated opposite are not shown in FIG. 2.

The tyre building drum comprises a central drum shaft 4 and two drum halves 5, 6 (FIG. 1) that are arranged at least almost substantially symmetrical with respect to the centre of the tyre building drum and around the drum shaft. One threaded spindle 7 is arranged in the drum shaft 4. On either side of the centre 3 of the tyre building drum 1 the thread has an equal-sized pitch yet in opposite direction. On either side of the centre 3 of the tyre building drum 1 a driving nut 8 (only one of which is shown in FIG. 2) is arranged on the spindle 7, wherein each driving nut 8 is fixedly connected to the drum half 5 (as shown in FIG. 2) in question via a connection part 9. The drum shaft 4 is provided with a drum shaft slot 10 for accommodating the connection part 9. The drum shaft slot 10 is of sufficient length to allow the axial movement of the connection part 9 necessary for the operation of the tyre building drum. Due to driving the spindle 7 the driving nut 8 is moved over the spindle 7, wherein the spindle nut 8 takes along the drum half 5 in question via the connection part 9. Thus both drum halves 5, 6 can be moved in axial direction of the tyre building drum 1.

The drum half 5 has a folding arm unit 11 having folding arms 12 which at the free end are provided with a roll 13. Each folding arm 12 is connected to the drum half 5 so as to swing about a swivel axle 14. The folding arm unit 11 can be moved jointly with the drum half 5 by driving the spindle 7 in axial direction of the tyre building drum 1.

The drum half 5 further has a bead ring core clamping unit 15 intended for supporting and clamping a bead ring core 16. The bead ring core clamping unit 15 is arranged on a cylindrical part 17 (only partially hatched for the simplicity of the drawing) arranged around the drum shaft 4. The cylindrical part 17 is provided with a cylinder slot 18 for accommodating the connection part 9. The cylinder slot 18 and the drum shaft slot 10 are in communication with each other so that the connection part 9 extends through both slots from the driving nut 8 to the drum half 5. The cylindrical part 17 is furthermore provided with a locking mechanism 19. In the exemplary embodiment shown in FIG. 2 the locking mechanism 19 comprises a piston part 20 that can be pneumatically activated, which piston part 20 is provided with piston part teeth 20a, wherein the drum shaft 4 is provided with drum shaft teeth 21, wherein the piston part teeth can be brought into engagement with the drum shaft teeth. In order to achieve more freedom as regards construction it is advantageous to place the locking mechanism shifted in circumferential direction with respect to the cylinder slot, although for the sake of simplicity of the drawing in FIG. 2 the embodiment is shown with the slot and the locking mechanism in one plane.

Figure 2A:
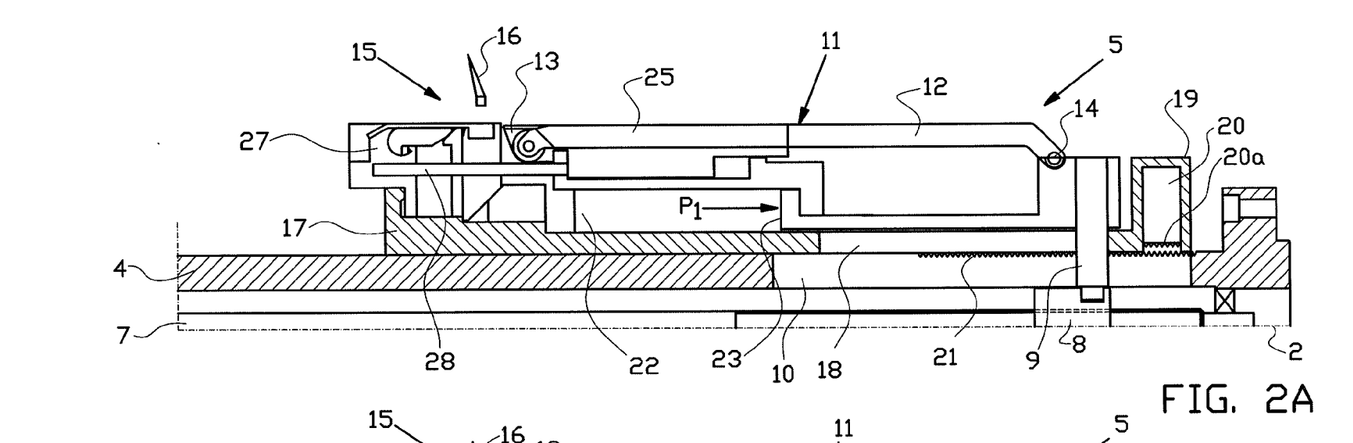
FIGS. 2A-2F schematically show a cross-section of the top part of one drum half in several stages of the tyre building process.
Figure 2B:
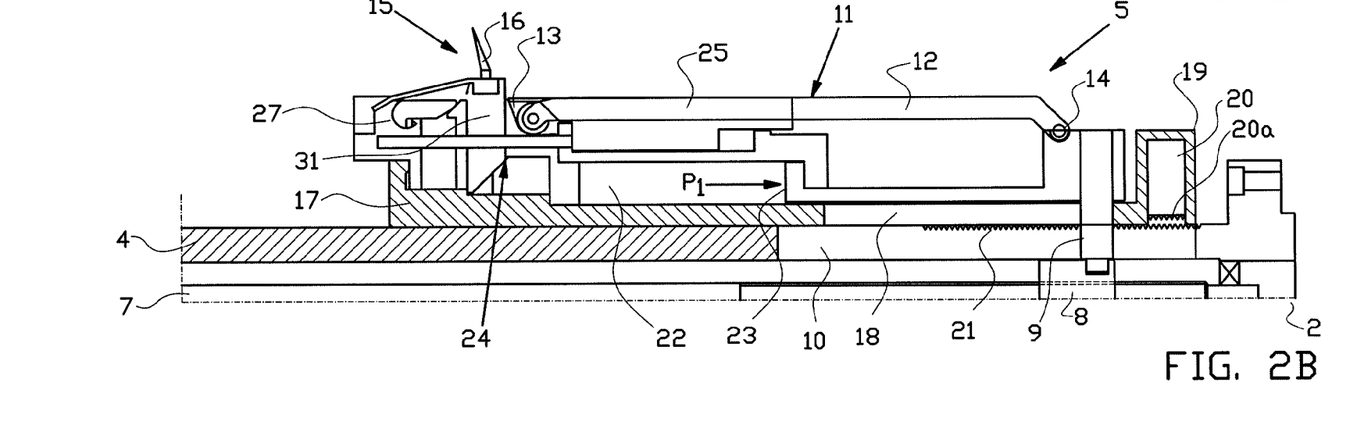
Figures 2C, 2D:
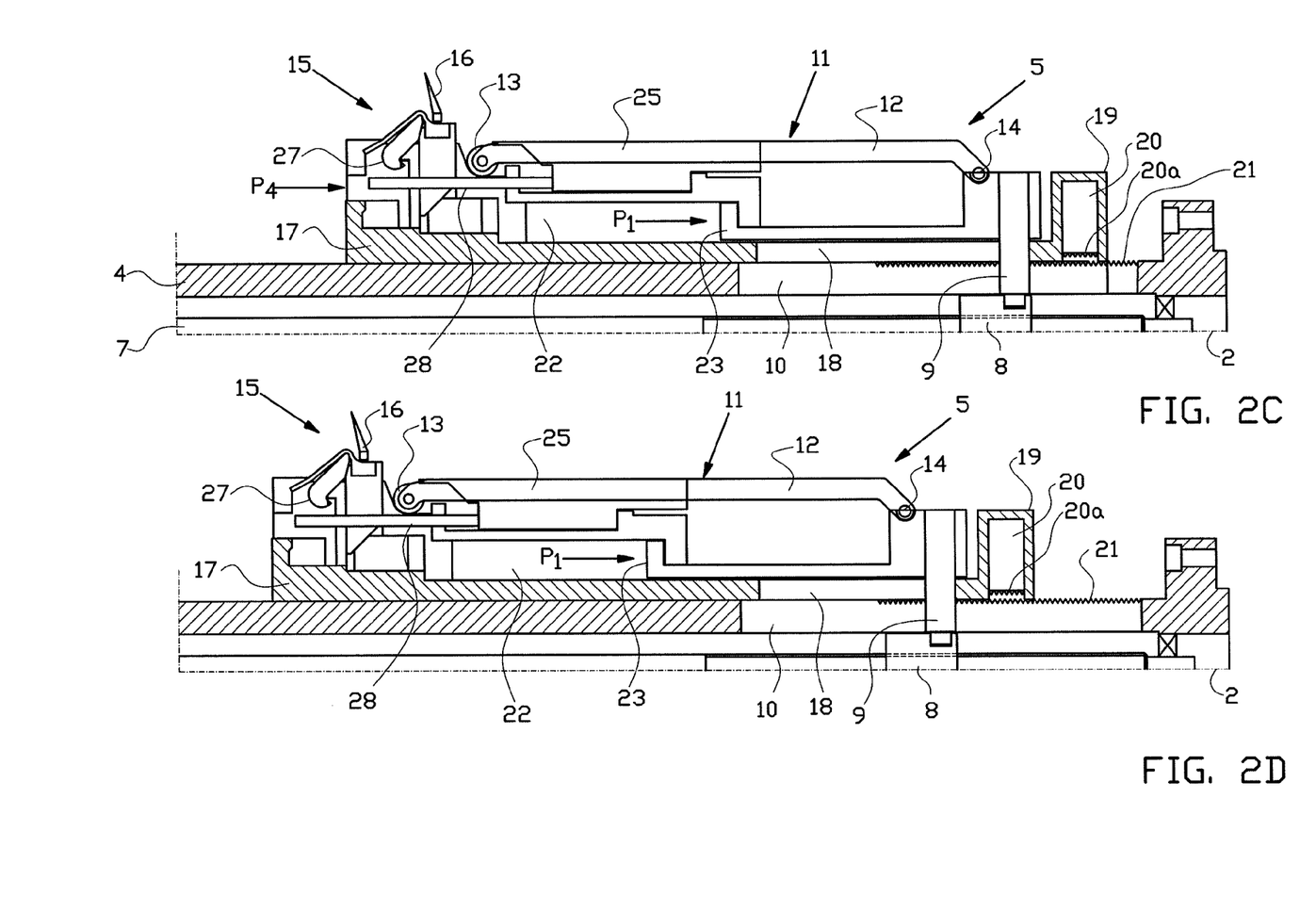
Figure 2E:
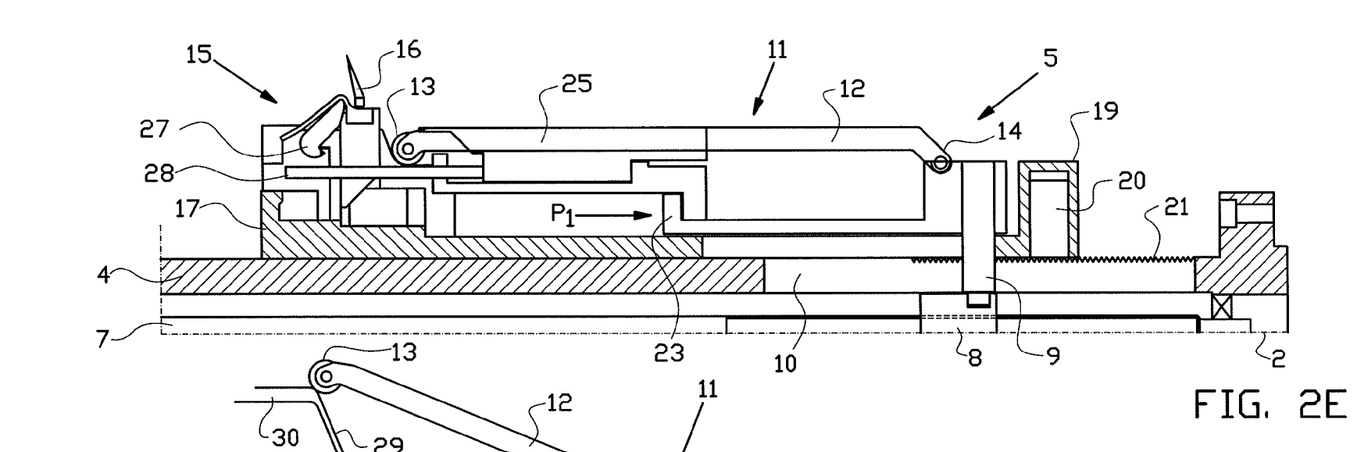
Figure 2F:
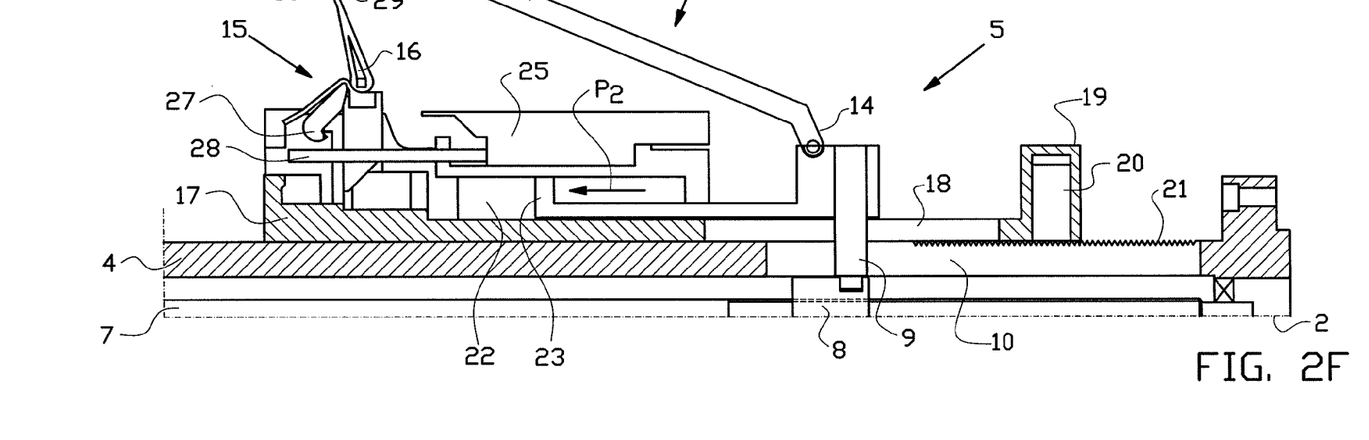

When the locking mechanism 19 has been brought into engagement with the drum shaft 4, the folding arm unit 11 can be moved with respect to the cylindrical part 17 (and therefore with respect to the bead ring core clamping unit 15) in axial direction of the tyre building drum 1. As a result when the locking mechanism 19 is in engagement with the drum shaft 4, at operation of the spindle 7, the folding arms 12 are swung upwards about the swivel axle 14, as schematically shown in FIG. 2F. When the locking mechanism is out of engagement, the operation of the spindle ensures movement of the drum half in its entirety.

For specific (particularly relatively heavy) tyre components 4, it is advantageous when the upward swinging of the folding arms is supported. In the embodiment shown said support is realised because the cylindrical part 17 comprises a piston chamber 22 in which a piston 23 can be moved, which piston 23 is fixedly connected to the folding arm unit 11. By applying pressure P2 (FIG. 2F) on the piston 23, swinging the folding arms 12 upward is supported by operation of the spindle 7.

The drum half 5 has a unit 24 (known per se) that can be pneumatically activated (shown in FIG. 2B by P3) for radially moving the bead ring core clamping unit 13 for clamping the bead ring core 16.

Figure 3A:
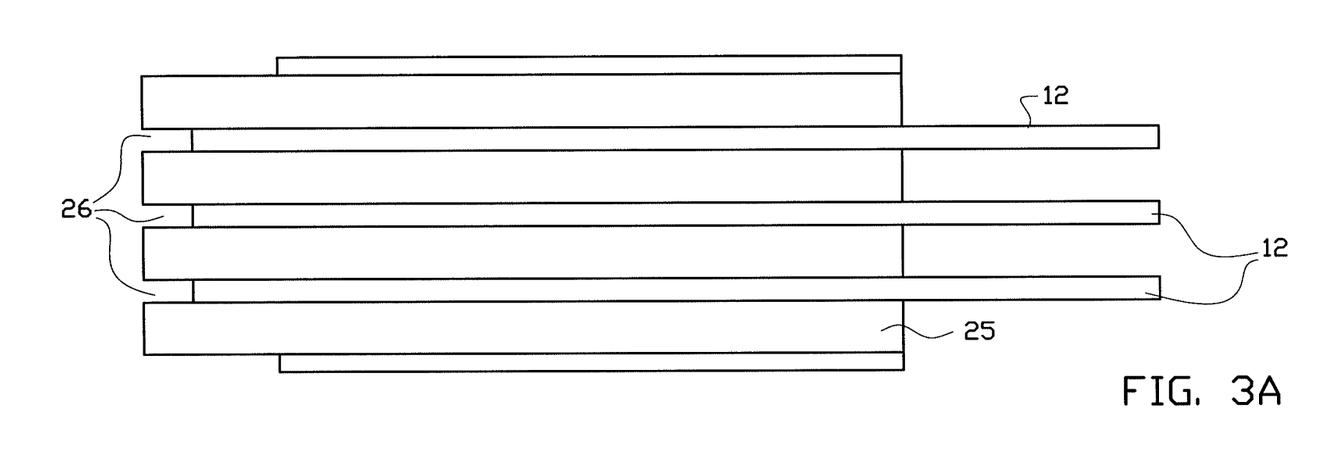
FIGS. 3A-3D schematically show a top and side view of a casing cover part with a folding arm in the position in which the casing cover part covers and releases, respectively, the roll of the folding arm.
Figure 3B:
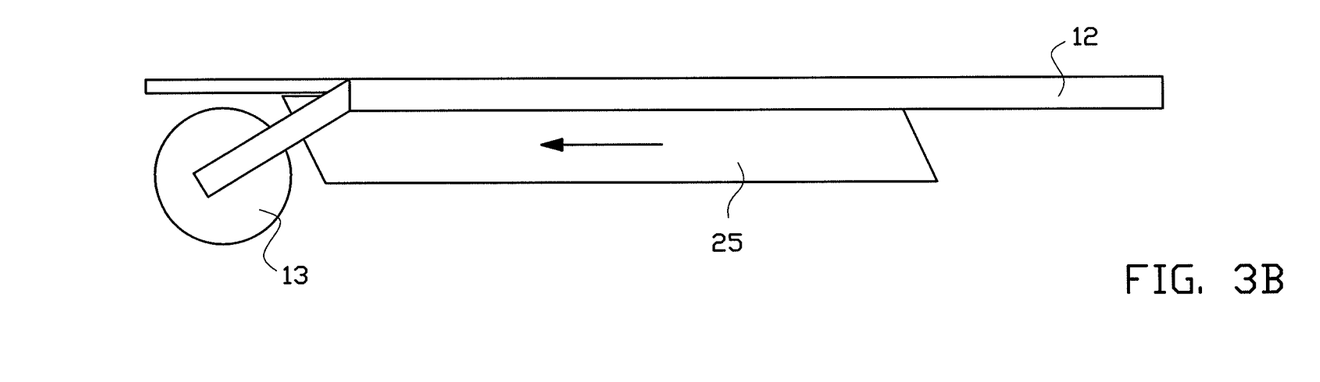
Figure 3C:
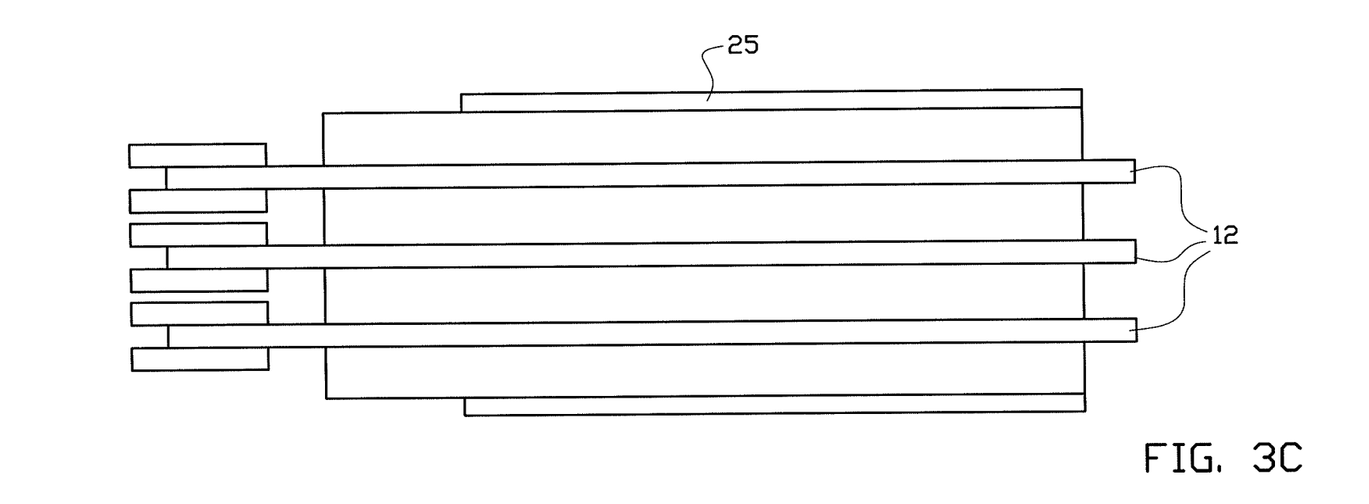
Figure 3D:
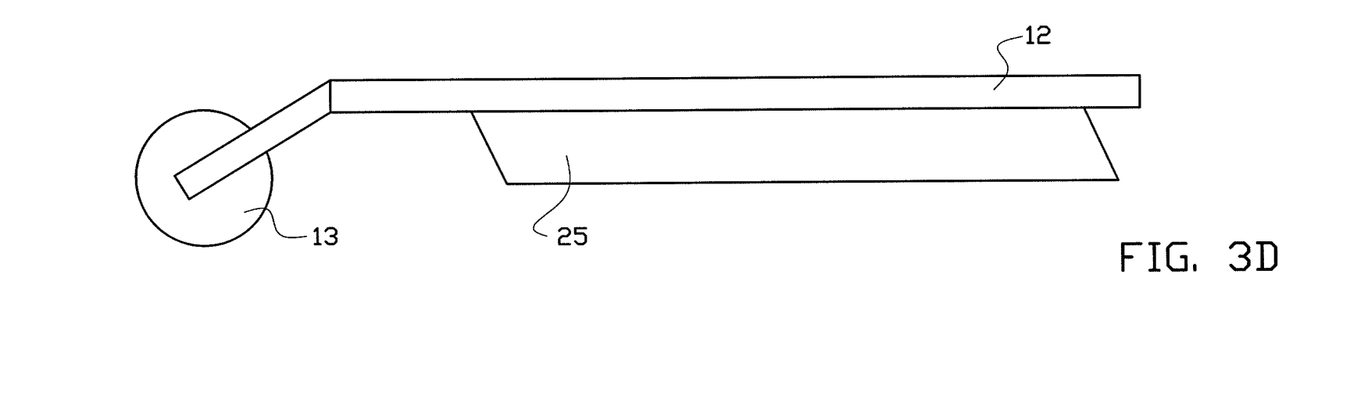

The drum half 5 further has a casing cover part 25 (also see FIGS. 3A-3D) that can be axially moved with respect to the cylindrical part 17. The casing cover part 25 forms an at least substantially closed casing surface for supporting rubber components from which the green tyre is manufactured. At the circumference the casing cover part is provided with recesses 26 (FIG. 3A) for accommodating the folding arms 12 and allowing them through when swung upward. In the situation as shown in FIGS. 2A and 2B the casing cover part 25 covers the rolls 13 of the folding arms 12 so that they are confined within the casing cover part 25. In the situation as shown in FIGS. 2C-2F the casing cover part 25 has been moved to the right (as seen in the drawing) with respect to the rolls 13, so that the rolls 13 are no longer confined and it is permitted that the folding arms 12 can be moved upwards through the recesses 26 of the casing cover part 25. Although not shown in the figures it is possible in one embodiment of the invention that the casing cover part 25 is provided with a vacuum device for retaining rubber components on the casing cover part, as a result of which the manufacture of a green tyre can be carried out more accurately. As the arms 12 with rolls 13 are swung upwards, a side wall 29 (FIG. 2F) is pressed around the bead ring core 16 and against a shaped carcass part 30.

As shown in FIGS. 2A-2F the bead ring core clamping unit 15 has a shoulder part 27 (known per se) for supporting (in the situation as shown in FIGS. 2C-2F) a bead core 16. Said shoulder part 27 according to the invention is mechanically connected to the casing cover part 25 by a mechanical connection 28. Due to said mechanical connection 28 bringing the shoulder part 27 in the supporting position and the axial movement of the casing cover part 25 for releasing the rolls 13 takes place simultaneously.

Particularly when the spindles 7 are driven by their own servomotor, a highly accurate drive can be realised. The servomotor can also be used to guarantee that both teeth 20a and 21 mesh correctly. As the configuration of the locking mechanism 19 is known, and the position of the drum half 5 with respect to the drum shaft 4 is known as a result of the servomotor, the servomotor is able to give a position signal to the operation of the locking mechanism at the correct position, in order to ensure that meshing takes place.

Below the operation of the tyre building drum 1 according to the invention will be described in short on the basis of FIGS. 2A-2F. In FIG. 2A the situation is shown in which the parts of the drum half 5 are in the inactive position. In the situation shown in FIG. 2B due to the locking mechanism 19, 20 and the drum shaft 4 being out of engagement and due to pressure maintenance P1 in the piston chamber 22 the bead ring core clamping unit 15 is coupled to the folding arm unit 11. Due to rotation of the spindle 7 the entire drum half 5 can be moved axially to the position in which the bead ring core 16 can be placed. After arranging the tyre components and the bead ring cores the bead ring core 16 can be clamped by pneumatically activating the unit 24 and radial movement of the segment 31 ensures clamping. In the situation as shown in FIG. 2C the shoulder part 27 is activated by driving the spindle 7 supported by pneumatic activation (P4). Simultaneously the casing cover part 25 is axially retracted. In FIG. 2D the entire drum half 5 is axially moved wherein the rubber components of the product to be built are partially inflated. In FIG. 2E the situation is shown in which the locking mechanism 19, 20 is brought into engagement with the drum shaft 4. Further driving of the spindle 7 and applying a pressure P2 in the piston chamber 22 ensures that the folding arms are moved upwards and towards the centre 3 of the building drum 1 so that the side wall 29 is pressed around the bead ring core and against the inflated carcass 30. After that the parts can be brought into the situation again as shown in FIG. 2A.

The above description is included to illustrate the operation of preferred embodiments of the invention and not to limit the scope of the invention. Starting from the above explanation many variations that fall within the spirit and scope of the present invention, particularly as defined in the attached claims, will be evident to an expert.

The invention claimed is:

1. Tyre building drum (1) for building an unvulcanised tyre using rubber tyre components, wherein the tyre building drum comprises a central drum shaft (4) and two drum halves (5, 6) arranged at least almost substantially symmetrical with respect to the centre (3) of the tyre building drum (1) and around the drum shaft (4), wherein in the drum shaft (4) one threaded spindle (7) is arranged, wherein on either side of the centre (3) of the tyre building drum (1) the thread has an equal-sized pitch yet in a mutually opposite axial direction of the one threaded spindle (7), wherein on either side of the centre (3) of the tyre building drum (1) a respective one from a pair of driving nuts (8) is arranged on the one threaded spindle (7), wherein each driving nut (8) is fixedly connected to a respective one of the drum halves (5, 6) via a respective connection part (9), wherein the drum shaft (4) is provided with two drum shaft slots (10), each one accommodating a respective one of the connection parts (9), wherein both drum halves (5, 6) are movable in an axial direction of the tyre building drum (1), wherein each drum half (5, 6) comprises a folding arm unit (11) with folding arms (12) that are connected to a respective one of the drum halves (5, 6) so as to swing, wherein each folding arm unit (11) is movable in the axial direction of the tyre building drum (1), wherein each drum half (5, 6) further comprises a bead ring core clamping unit (15), intended for supporting and clamping a bead ring core (16), wherein each bead ring core clamping unit (15) is arranged on a respective cylindrical part (17) of its drum half (5, 6), each cylindrical part (17) being arranged around the drum shaft (4), wherein each cylindrical part (17) is provided with a respective cylinder slot (18) for accommodating the connection part (9) of its drum half (5, 6), wherein each driving nut (8) is fixedly connected to the folding arm unit (11) of its drum half (5,6) via the connection part of that drum half (5,6) so that the connection part (9) of that drum half (5, 6) and the folding arm unit (11) connected thereto are movable in the axial direction of the one threaded spindle (7) with respect to said cylindrical part (17) of that drum half (5, 6), wherein each of said cylindrical parts (17) is provided with a locking mechanism (19), wherein each locking mechanism (19) can be brought into and out of engagement with the drum shaft (4), wherein at engagement of each locking mechanism (19) with the drum shaft (4) the cylindrical part (17) associated with that locking mechanism (19) and the bead ring core clamping unit (15) associated with that locking mechanism (19) are fixed in the axial direction of the tyre building drum (1) while, at the operation of the one threaded spindle (7), each connection part (9) is arranged to move its folding arm unit (11) over the fixed cylindrical part (17) of its drum half (5, 6) with respect to the fixed bead ring core clamping unit (15) of its drum half (5, 6) in the axial direction of the tyre building drum (1) such that the folding arms (12) of its drum half (5, 6) are swung upwards, wherein, in the position in which the locking mechanisms (19) are out of engagement with the drum shaft (4), at the operation of the one threaded spindle (7) the connection parts (9) are arranged to move their respective drum halves (5) in the axial direction of the tyre building drum (1).

2. Tyre building drum (1) according to claim 1, wherein each locking mechanism (19) comprises a respective piston part (20) that can be pneumatically activated and is provided with piston part teeth (20a), wherein the drum shaft (4) is provided with drum shaft teeth (21), wherein the piston part teeth (20a) of each locking mechanism (19) can be brought into engagement with the drum shaft teeth (21).

3. Tyre building drum (1) according to claim 1, wherein each locking mechanism (19) is placed shifted in a circumferential direction with respect to the cylinder slot (18) of its drum half (5, 6).

4. Tyre building drum (1) according to claim 1, wherein each cylindrical part (17) comprises a respective piston chamber (22) in which a respective piston (23) can be moved, each piston (23) being fixedly connected to the folding arm unit (11) of its drum half (5, 6).

5. Tyre building drum (1) according to claim 1, wherein each drum half (5, 6) comprises a respective unit (24) which can be pneumatically activated for radially moving the bead ring core clumping unit (15) of its drum half (5, 6).

6. Tyre building drum (1) according to claim 1, wherein each drum half (5, 6) comprises a respective casing cover part (25) which is axially movable with respect to the cylindrical part (17) of its drum half (5, 6), each casing cover part (25) forming an at least substantially closed casing surface for supporting the rubber components and at its circumference is provided with recesses (26) for accommodating and letting through the folding arms (12) of its drum half (5, 6).

7. Tyre building drum (1) according to claim 6, wherein each casing cover part (25) is provided with a vacuum device for retaining the rubber components.

8. Tyre building drum (1) according to claim 6, wherein each bead ring core clamping unit (15) comprises a respective shoulder part (27) for supporting the bead core (16) associated with its drum half (5, 6), each shoulder part (27) being mechanically connected to the casing cover part (25) of its drum half (5, 6) by a respective mechanical connection (28).

9. Tyre building drum (1) according to claim 1, wherein the one threaded spindle (7) is driven by a servomotor.

* * * * *